(12) United States Patent
Li

(10) Patent No.: US 8,711,381 B2
(45) Date of Patent: Apr. 29, 2014

(54) IMAGE FORMING APPARATUS AND JOB REQUEST CONTROL METHOD INSTRUCTED BY AUTHENTICATED USERS

(75) Inventor: Bin Li, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1145 days.

(21) Appl. No.: 12/186,787

(22) Filed: Aug. 6, 2008

(65) Prior Publication Data

US 2009/0073487 A1 Mar. 19, 2009

(30) Foreign Application Priority Data

Sep. 14, 2007 (JP) ................................. 2007-240088

(51) Int. Cl.
*G06K 15/00* (2006.01)

(52) U.S. Cl.
USPC .......... 358/1.14; 358/1.15; 358/1.16; 380/28; 726/27

(58) Field of Classification Search
None
See application file for complete search history.

(56) References Cited

U.S. PATENT DOCUMENTS

| 7,096,496 B1* | 8/2006 | Challener et al. ............... 726/17 |
| 2003/0197885 A1* | 10/2003 | Takeo ......................... 358/1.14 |
| 2004/0070782 A1* | 4/2004 | Mihira ........................ 358/1.14 |
| 2004/0095595 A1* | 5/2004 | Jacobsen ..................... 358/1.14 |
| 2004/0136533 A1* | 7/2004 | Takagaki et al. .............. 380/255 |
| 2005/0007619 A1* | 1/2005 | Minato ........................ 358/1.14 |
| 2005/0044549 A1* | 2/2005 | Morikawa et al. ............. 718/102 |
| 2005/0207570 A1* | 9/2005 | Yamamoto et al. ............. 380/28 |
| 2005/0213115 A1* | 9/2005 | Johnson et al. .............. 358/1.16 |
| 2005/0216773 A1* | 9/2005 | Mitchell et al. ............... 713/201 |
| 2005/0235345 A1* | 10/2005 | Mitchell et al. ................. 726/10 |
| 2005/0273843 A1* | 12/2005 | Shigeeda .......................... 726/5 |
| 2006/0056666 A1* | 3/2006 | Mizutani et al. .............. 382/118 |
| 2006/0064742 A1* | 3/2006 | Takahashi et al. ................ 726/4 |
| 2006/0279781 A1* | 12/2006 | Kaneko ........................ 358/1.15 |
| 2007/0002351 A1* | 1/2007 | Yoshimura et al. ........... 358/1.15 |
| 2007/0076238 A1* | 4/2007 | Odagiri ........................ 358/1.14 |
| 2007/0136820 A1* | 6/2007 | Saito ............................... 726/27 |
| 2007/0182986 A1* | 8/2007 | Ciriza et al. ................. 358/1.15 |
| 2007/0263252 A1* | 11/2007 | Hara ............................ 358/1.15 |
| 2008/0028448 A1* | 1/2008 | Tsuchitoi ......................... 726/6 |

FOREIGN PATENT DOCUMENTS

| JP | 2005-278143 | 10/2005 |
| JP | 2006-72808 | 3/2006 |
| JP | 2006-130879 A | 5/2006 |
| JP | 2006-520112 | 8/2006 |

OTHER PUBLICATIONS

Japanese Office Action issued Mar. 6, 2012, in Patent Application No. 2007-240088.

* cited by examiner

*Primary Examiner* — Firmin Backer
*Assistant Examiner* — Nicholas Pachol
(74) *Attorney, Agent, or Firm* — Oblon, Spivak, McClelland, Maier & Neustadt, L.L.P.

(57) ABSTRACT

An image forming apparatus executing a job based on authority of an account and capable of controlling a job instructed by an authorized user is disclosed. The image forming apparatus includes a certification ticket generation unit generating a certification ticket corresponding to the job and account information of the account instructing the execution of the job; a job information generation unit generating job information of the job; a certification ticket validity determination unit determining whether the certification ticket is valid; a job validity determination unit determining whether the execution of the job by the account is valid based on the job information corresponding to the certification ticket that has been determined valid by the certification ticket validity determination unit; and a job control unit executing the job, the execution of the job having been determined valid by the job validity determination unit.

15 Claims, 13 Drawing Sheets

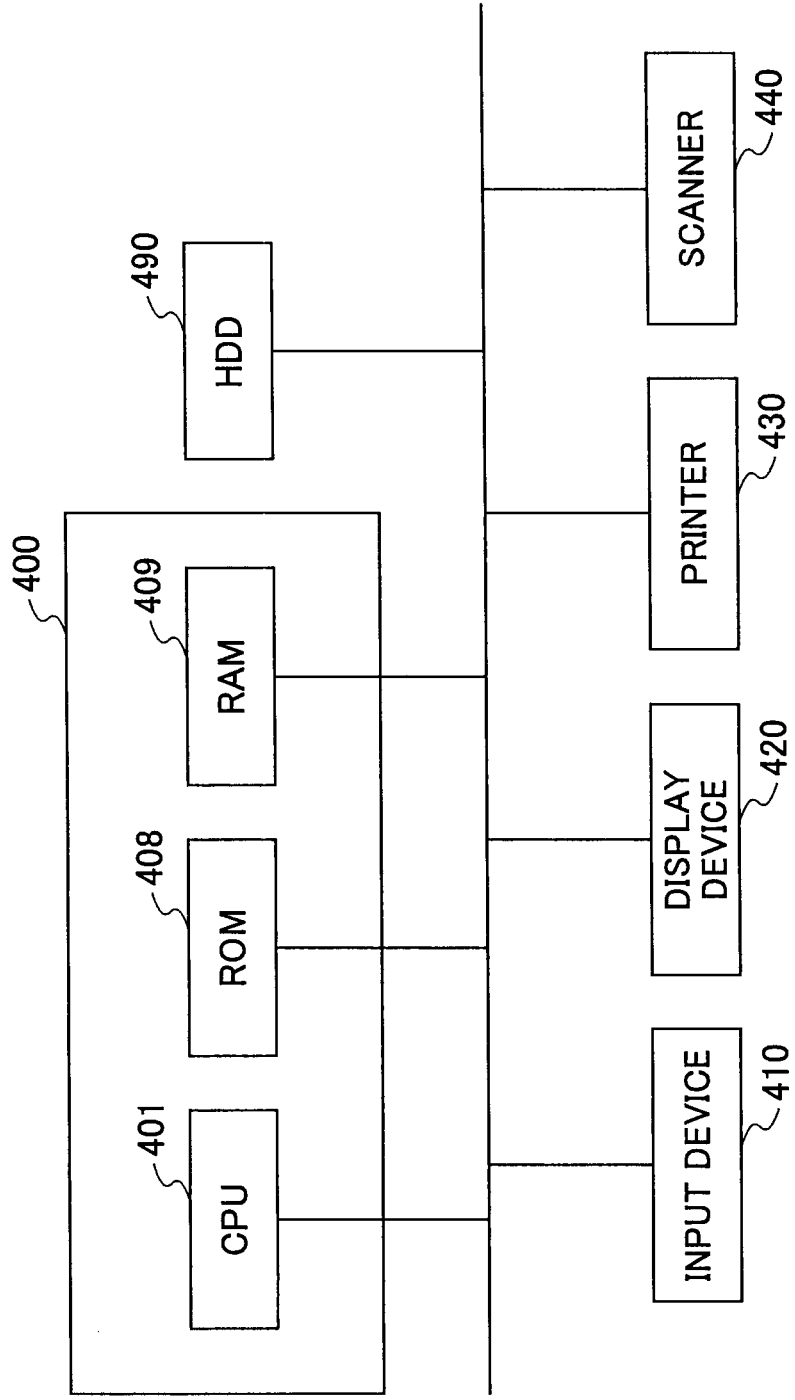

IMAGE FORMING APPARATUS AND JOB REQUEST CONTROL METHOD INSTRUCTED BY AUTHENTICATED USERS

CROSS-REFERENCE TO RELATED APPLICATIONS

The present application claims priority under 35 U.S.C §119 to Japanese Patent Application Publication No. 2007-240088 filed Sep. 14, 2007, the entire contents of which are hereby incorporated herein by reference.

BACKGROUND OF THE INVENTION

1. Field of the Invention

The present invention generally relates to an image forming apparatus, a job control method, and an information recording medium.

2. Description of the Related Art

Conventionally, there have been known techniques for allowing users to execute a job or access data based on the authority of the user. For example, Japanese Patent Application Publication No. 2006-72808 discloses an information processing apparatus in which access to an electronic file from a user terminal is permitted based on the physical position of the user terminal.

In an image forming apparatus, a scanning job and a printing job are usually performed after the scanning conditions and printing conditions are specified. For example, Japanese Patent Application Publication No. 2005-278143 discloses an image forming apparatus in which scanning conditions and printing conditions are specified from a client terminal, and an image forming apparatus capable of performing the process in accordance with the specified scanning conditions and printing conditions is selected to perform the process. Similarly, there may be cases where an image forming apparatus includes plural functions but the functions that can be used by the users may be different depending on the users.

However, in such an image forming apparatus capable of determining whether a job is to be executed based on the authority of each user, when, for example, an authenticated user attempts to cancel a job that had been requested by the authenticated user before, it is necessary to authenticate the user again. Unfortunately, there have been no access control methods disclosed capable of eliminating such an additional authentication process including in a technique disclosed in Japanese Patent Application Publication No. 2006-72808.

As a result of this inconvenience, there may arise a problem that when, for example, a user has instructed an image forming apparatus to execute a job using his/her account so that the job is executed at a prescribed execution time and then logs off, but later the user logs in and attempts to control the job, (such as cancel the job), the image forming apparatus may not recognize the relationship between the account of the user and the job. Furthermore, when a user sets an execution time of a job so that the job is to be executed at the execution time later but power to the image forming apparatus is turned OFF, the information of the job instruction may be disadvantageously deleted, thereby making it impossible to execute the job.

SUMMARY OF THE INVENTION

The present invention is made in light of the above problems and may provide an image forming apparatus capable of controlling the jobs instructed by authenticated users.

To that end, an image forming apparatus according to an embodiment of the present invention employs the following configurations.

According to an aspect of the present invention, there is provided an image forming apparatus executing a job based on authority of each account. The image forming apparatus includes a certification ticket generation unit generating a certification ticket corresponding to the job and account information of an account requesting the execution of the job; a job information generation unit generating job information of the job; a certification ticket validity determination unit determining whether the certification ticket is valid; a job validity determination unit determining whether the execution of the job by the account is valid based on the job information corresponding to the certification ticket that has been determined valid by the certification ticket validity determination unit; and a job control unit executing the job, the execution of the job having been determined valid by the job validity determination unit.

Because of the feature, the image forming apparatus may control the job requested by an authenticated user.

It should be noted that the embodiments of the present invention further include a job control method in the image forming apparatus and an information recording medium storing a computer program causing a computer to execute the job control method.

Advantageously, an image forming apparatus, a job control method, and an information recording medium according to embodiments of the present invention may control the job requested by an authorized user.

BRIEF DESCRIPTION OF THE DRAWINGS

Other objects, features, and advantages of the present invention will become more apparent from the following description when read in conjunction with the accompanying drawings, in which:

FIG. 13 is a block diagram showing an exemplary configuration of a computer realizing an image forming apparatus according to an embodiment of the present invention.

DETAILED DESCRIPTION OF THE PREFERRED EMBODIMENTS

In the following, an embodiment of the present invention is described with reference to the accompanying drawings.
(Embodiment of the Present Invention)

Figure 1:
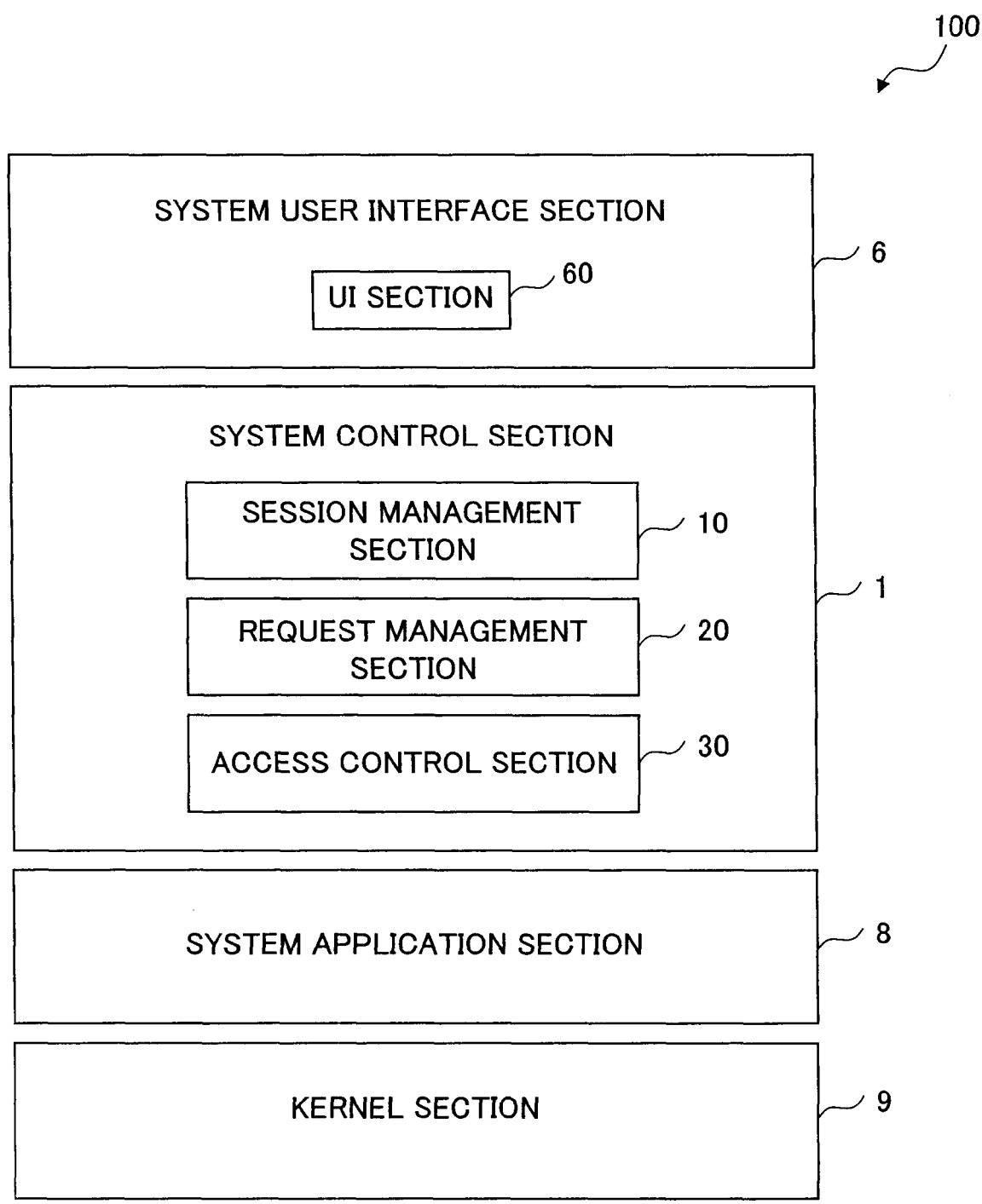
FIG. 1 is a block diagram showing an exemplary configuration of a control section of an image forming apparatus according to an embodiment of the present invention.

FIG. 1 shows an exemplary configuration of a control section of an image forming apparatus according to an embodiment of the present invention. The control section 100 controls the image forming apparatus to realize its functions, and includes the user interface corresponding to the functions. As shown in FIG. 1, the control section 100 includes a system user interface section 6, a system control section 1, a system application section 8, and a kernel section 9.

The system user interface section 6 realizes a user interface including a local user interface such as an operations panel and generates a display menu on a client terminal (not shown). As shown in FIG. 1, the system interface section 6 includes a user interface section (hereinafter referred to as an "UI section") 60. Through the UI section 60, an operator inputs an instruction toward the image forming apparatus, and the status of the image forming apparatus may be displayed on the UI section 60.

The system control section 1 includes major sections of an image forming apparatus according to an embodiment of the present invention. As shown in FIG. 1, the system control section 1 includes a session management section 10, a request management section 20, and an access control section 30. The session management section 10 associates and manages an account of a user with the corresponding process requested by the account during a period from when the user logs in to when the user logs out.

In this description, the term "a user logs in" refers to the situation where an account of a user is authenticated by an image forming apparatus and the image forming apparatus is capable of accepting an instruction when the account is being used. On the other hand, the term "a user logs out" refers to the situation where the login status is changed into the status before the login status is started. Further, the term one "session" refers to the duration from when a user logs in to when the user logs out.

Further, the session management section 10 determines whether a certification ticket described below is valid upon a request from the request management section 20 during and after the session. Because of this feature, even after a user logs out, it becomes possible to properly determine whether a job is valid and accordingly to control the job, the job being requested by the user during the login status of the user.

Upon receiving an instruction to execute a job, the request management section 20 outputs an instruction to the session management section 10 to perform a necessary process. Further, the request management section 20 controls the execution order of resources in the image forming apparatus to effectively execute plural jobs.

Based on the authority of the account used to execute a job, the access control section 30 determines whether the job is valid. The authority information of each account may be stored in a storage section (not shown).

The system application section 8 may include plural applications corresponding to the functions of the image forming apparatus. A job is constituted by controlling the execution order of the applications by the request management section 20.

The kernel section 9 transmits the instructions from, for example, the system user interface section 6, the system control section 1, and the system application section 8 to each of the devices in the image forming apparatus and the responses from each of the devices to the each of the sections. The devices may include a scanner, a plotter, a facsimile machine, a hard disk device, and a network interface card.
(Exemplary Configuration of an Image Forming Apparatus According to an Embodiment of the Present Invention)

Figure 2:
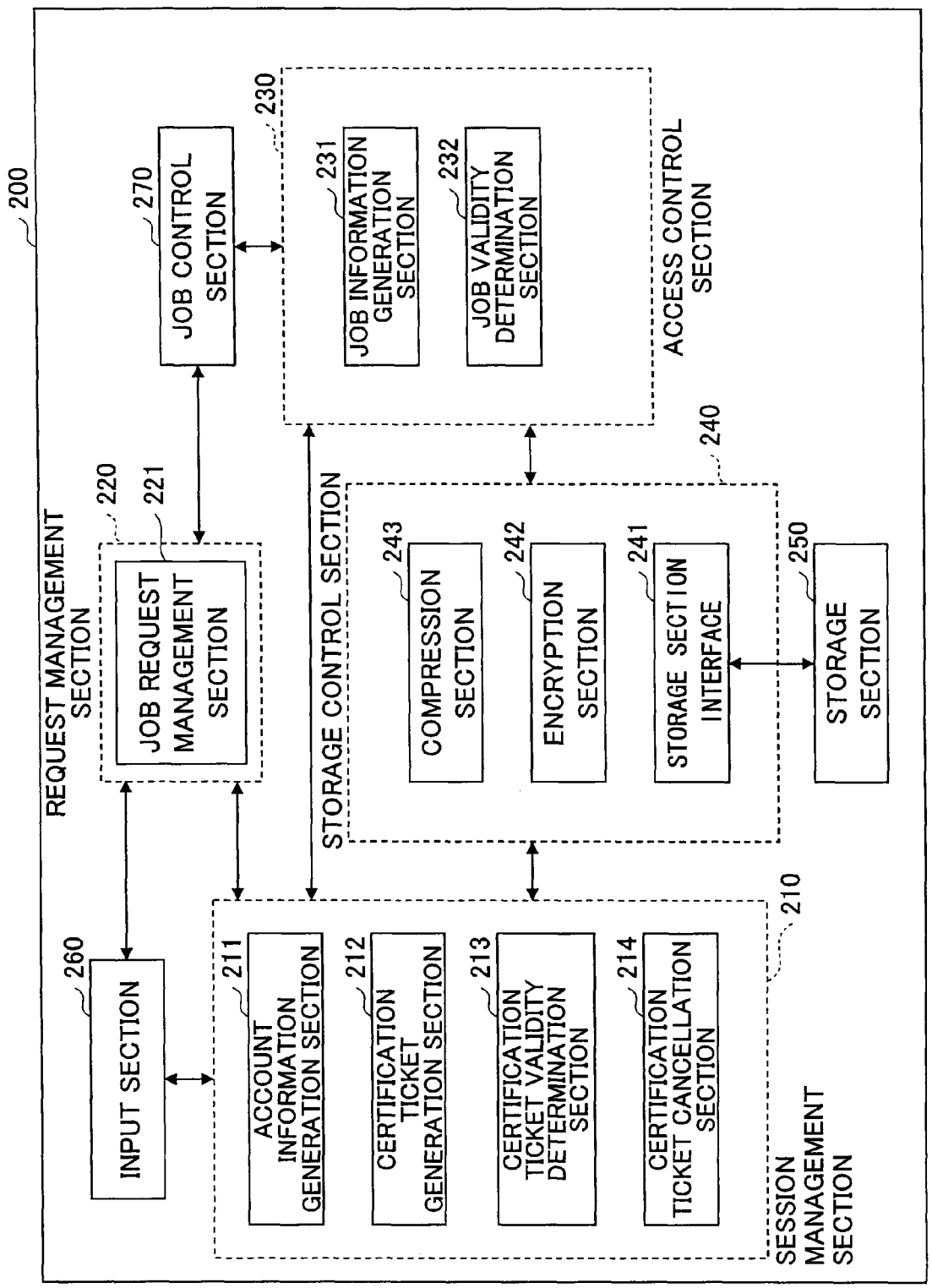
FIG. 2 is a block diagram showing a functional configuration of an image forming apparatus according to an embodiment of the present invention.

FIG. 2 is a block diagram showing an exemplary configuration of an image forming apparatus according to an embodiment of the present invention. As shown in FIG. 2, the image forming apparatus 200 may include a session management section 210, a request management section 220, an access control section 230, a storage control section 240, a storage section 250, an input section 260, and a job control section 270.

The session management section 210 may include an account information generation section 211, a certification ticket generation section 212, a certification ticket validity determination section 213, and a certification ticket cancellation section 214. When a user logs in, the account generation section 211 generates account information of the account of the user.

The term "account information" as used herein refers to the information item on which the determination of the validity of the account is based and is also herein called the "certification". The certification is generated based on the authentication when a user logs in and used for identifying the account. Further, the certification is stored into the storage section such as a memory in the image forming apparatus 200. By doing this, it becomes possible to determine whether the account of the user can use the functions during the session of the account.

The certification may include the information items of the user account, the user authority, the organization to which the user belongs, and the validity period of the certification.

When a user inputs an instruction to a job, the certification ticket generation section 212 generates a certification ticket corresponding to the job based on the certification of the user. The certification ticket generated by the certification ticket generation section 212 may include the same information items as those in the certification. The certification ticket is generated based on an instruction to a job. When the certification ticket includes the information item of the execution time of the job, the validity period of the certification ticket is determined based on the execution time.

The validity period of the certification ticket may be specified equal to the execution time of the job corresponding to the certification ticket. Further, when, for example, the access control section 230 outputs a request to determine whether the certification ticket is valid at a prescribed time in consideration of the execution time of the job, the validity period of the certification ticket may be specified so as to wait until the determination process has been finished.

Upon receiving the request from the access control section 230, the certification ticket validity determination section 213 determines whether the certification ticket is valid by comparing the information items in the certification ticket such as the user account, the user authority, and the organization to which the user belongs with the information items of the user previously stored in the storage section 250 in the image forming apparatus 200.

Upon receiving a request from the request management section 220, the certification ticket cancellation section 214 cancels the job by invalidating the certification ticket. The term "to invalidate the certification ticket" herein refers to that, for example, when the certification ticket is stored in the storage section 250, the certification ticket is deleted from the storage section 250, or a prescribed information item of the certification ticket may be altered or deleted.

The request management section 220 may include a job request management section 221. When, for example, a request to a job is given through the input section 260, the job request management section 221 controls, for example, the execution of the job and the authentication of the user by controlling the order of the processes performed by the devices in the session management section 210, the access control section 230, and the image forming apparatus 200.

The access control section 230 may include a job information generation section 231 and a job validity determination section 232. When a request to a job is given through the input section 260, the job information generation section 231 generates the job information representing the contents of the job. The job validity determination section 232 determines whether the job is valid based on the determination whether the account requesting the execution of the job has the authority to execute the job based on the job information.

The storage control section 240 may include a storage section interface 241, an encryption section 242, and a compression section 243. The storage section interface 241 is the interface used when data are stored in and read from the storage section 250. Further, for example, the storage section 250 may include plural storage sections having different access rates from each other. In this case, the storage section interface 241 may select any one of the storage sections in accordance with the contents of the job, for example, the execution time of the job and the importance of the job.

The encryption section 242 encrypts the certification ticket and/or the job information to be stored in the storage section 250. The encryption section 242 may support plural encryption methods and select one of the encryption methods in accordance with the contents of the job.

The compression section 243 compresses the certification ticket and/or the job information to be stored in the storage section 250. The compression section 243 may support plural compression methods and select one of the compression methods or a compression rate in accordance with the contents of the job.

The storage section 250 stores and holds the certification ticket and/or the job information. Preferably, for example, a nonvolatile memory or a hard disk device may be used as the storage section 250. By doing this, the information once stored in the storage section 250 is readable while power is turned ON even after power is once turned OFF.

As the storage section 250, for example, a RAM capable of reading and writing data at high speed may be used. By selecting this, when a job is requested and successively the job is executed, it may become possible to reduce the time period between when the request is given and when the job is executed, thereby improving the operability of the image forming apparatus.

Further, the storage section 250 may be, for example, a hard disk device of the image forming apparatus 200, a drive device with a computer-readable information recording medium inserted therein, a hard disk device managed by an external server, or an information recording medium inserted in the drive of the server.

The input section 260 is input means through which an operator inputs, for example, an instruction with respect to a job including the executing conditions of the job to the image forming apparatus 200. The input section 260 may be, for example, a operations panel or a communication section to receive an instruction from a client device (not shown).

The job control section 270 controls the execution of the job that has been determined valid. Further, the job control section 270 controls, for example, the devices of the image forming apparatus 200.

The elements in FIGS. 1 and 2 correspond to the objects shown in FIGS. 3 through 8 in a manner described below. The session management section 210, a request management section 220, an access control section 230, an input section 260, and a job control section 270 correspond to the session management section 10, a request management section 20, an access control section 30, the UI section 60, and an execution control section 70, respectively.

(Example of a Process)

FIGS. 3 through 8 are sequence diagrams showing a job control method according to an embodiment of the present invention. In the following descriptions of FIGS. 3 through 8, it is assumed that all the steps are performed synchronously as illustrated in those figures. However, the embodiment of the present invention is not limited to this, and any step described below and shown in the figures may be performed asynchronously.

(Example where an Instruction to Execute a Job is Given and the Job is Successively Executed)

Figure 3:
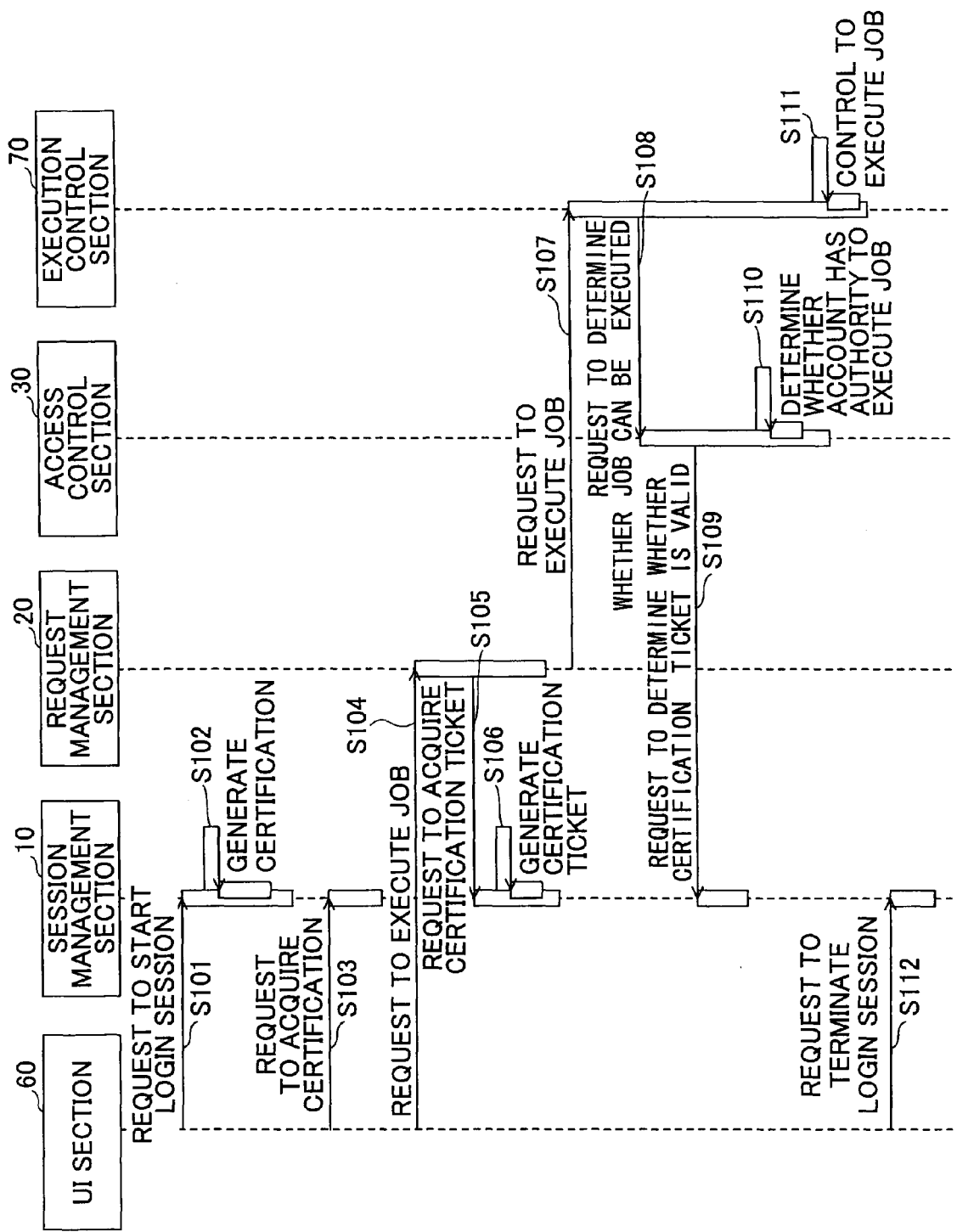
FIG. 3 is a sequence diagram showing an exemplary process of requesting a job and successively executing the job.

FIG. 3 is a sequence diagram showing an example where an instruction to execute a job is given and the job is successively executed. In the example of FIG. 3, when an operator inputs a login instruction through the UI section 60, the login process based on the account of the operator is started. The term "login instruction" refers to a request to execute an authentication process with respect to the account of the operator by inputting, for example, the identification information and the password of the operator.

Referring to FIG. 3, in step S101, the UI section 60 outputs a login instruction to the session management section 10. The login instruction may also be called a login session start request. In the following step S102, based on the login instruction in step S101, the session management section 10 authenticates the account, and, when the authentication is successful, generates a certification representing the account information of the account.

In the following step S103, when the operator inputs an instruction to execute the job through the UI section 60, the UI section 60 outputs a request to acquire the certification as authentication information to the session management section 10. By acquiring the certification based on the request, it becomes possible to use functions of the image forming apparatus 200 in accordance with the authentication range based on the contents of the acquired certification.

In the following step S104, the UI section 60 outputs a request to execute the job to the request management section 20. The request includes the certification acquired in step S103.

In the following step S105, the request management section 20 outputs a request to acquire a certification ticket to the session management section 10. In the following step S106, based on the request in step S105, the session management section 10 generates the certification ticket. The certification ticket generated in this step may be stored in, for example, the storage section 250 of the image forming apparatus 200. As the storage section 250, a storage unit capable of reading and writing data at higher speed such as a RAM may be used.

In the following step S107, the request management section 20 outputs a request to execute the job to the execution control section 70. In the following step S108, the execution control section 70 outputs a request to determine whether the job can be executed to the access control section 30.

In the following step S109, the access control section 30 outputs a request to determine whether the certification ticket is valid to the session management section 10. Based on the request, the session management section 10 determines whether the certification ticket is valid. In the following, a case is described where the certification ticket is determined valid.

In the following step S110, the access control section 30 determines whether the account has the authority to execute the job corresponding to the certification ticket that has been determined valid by the session management section 10.

This determination may be made by reference to the authority information of each account based on the job information corresponding to the certification ticket and the account information corresponding to the certification ticket. According to the determination, it is determined whether the account has the authority to execute the job. In the following, a case is described where it is determined that the account has the authority to execute the job. In the following step S111, the execution control section 70 controls executing the job.

In the following step S112, when the operator inputs a logout instruction through the UI section 60, the UI section 60 outputs a request to terminate the login session to the session management section 10. Based on this request, the session management section 10 terminates the login session of the account. It should be noted that it is not always necessary that the process in step S112 be performed successively after the process in step S111. Namely, the process in step S112 may be performed based on the logout instruction after a process of any other step is performed.

It should be noted that, after being generated in step S106 and stored in the storage section 250 in the image forming apparatus 200, the certification ticket is deleted any time after the job is executed in step S111. By doing this, a one-to-one relationship between the job and the certification ticket can be maintained.

Further, the certification generated in step S102 may be deleted, for example, when the login session is terminated, or deleted after a certain period of time has passed since the login session is terminated.

(Example where a Certification Ticket is Stored in the Storage Section)

Figure 4:
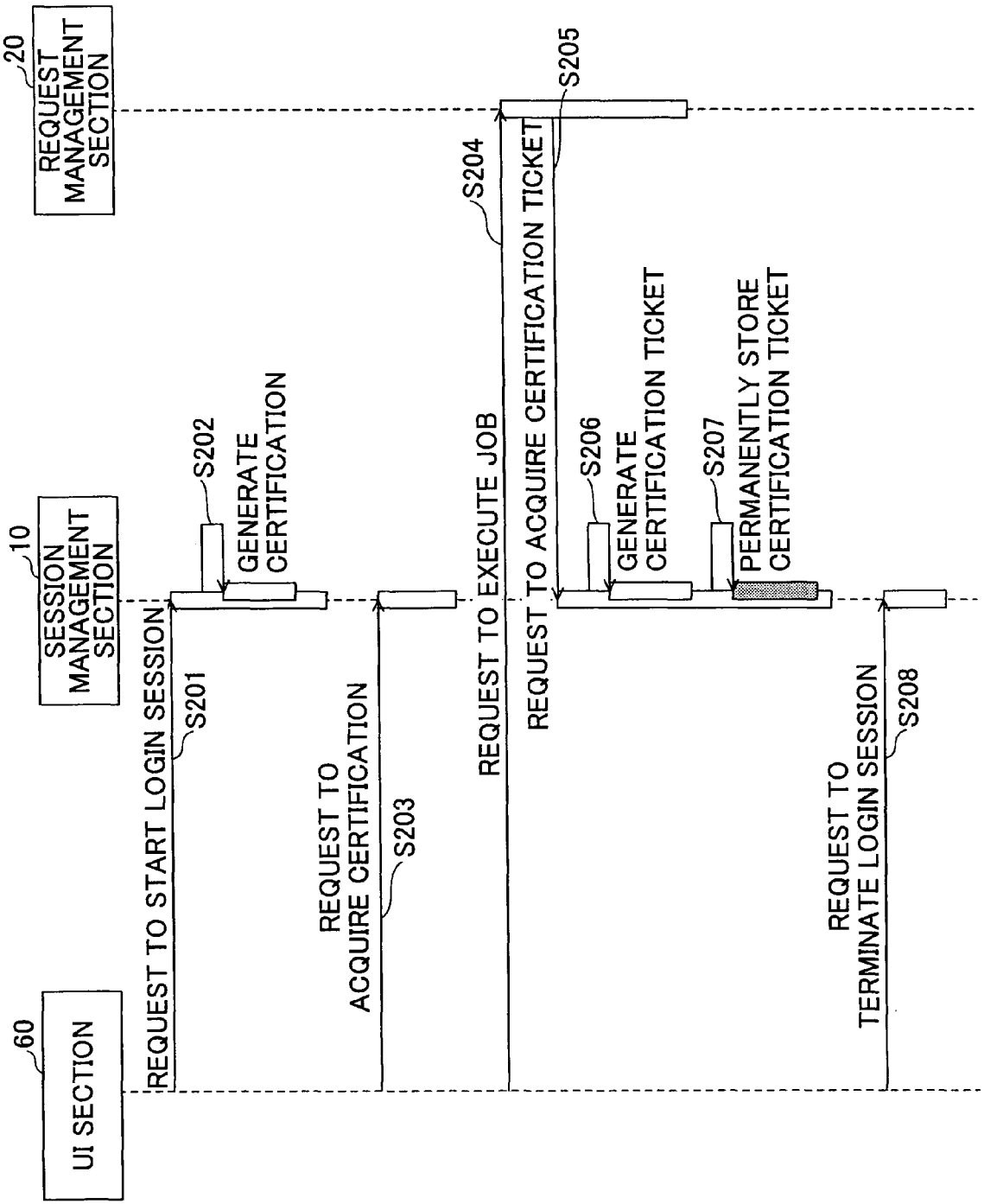
FIG. 4 is a sequence diagram showing an exemplary process of storing a certification ticket into a storage section.

FIG. 4 is a sequence diagram showing an example where the certification ticket is stored in the storage section. Referring to FIG. 4, the processes in steps S201 through S206 are the same as those in steps S101 through S106; therefore the descriptions of steps S201 through S206 are herein omitted.

In the following step S207, the session management section 10 permanently stores the certification ticket generated in the step S206 through the storage section interface 241. The term "to permanently store" refers to storing data in a storage unit such as a nonvolatile memory or a hard disk device and therefore making the data readable while power is supplied even after the power has once been turned OFF.

In the following step S208, when the operator inputs a logout instruction through the UI section 60, the UI section 60 outputs a request to terminate the login session to the session management section 10. Based on this request, the session management section 10 terminates the login session of the account. It should be noted that it is not always necessary that the process in step S208 be performed successively after the process in step S207. Namely, the process in step S208 may be performed based on the logout instruction after a process of any other step is performed. Further, the process in step S208 may be performed after the processes in FIGS. 5 through 8 are performed.

By permanently storing the certification ticket in step S207, it becomes possible to control the job corresponding to the certification ticket even after the account is once logged out. It should be noted that the term "to control a job" refers to not only executing the job but also, for example, cancelling the instruction to the job.

Further, the certification ticket may be encrypted before being stored in the storage section 250. By doing this, the account information of the user is encrypted, thereby maintaining the security of the image forming apparatus 200. Further, the certification ticket may be compressed before, for example, being stored in the storage section 250. By doing this, the storage area of the storage section 250 may be reduced, thereby simplifying the configuration and reducing the cost of the image forming apparatus 200.

(Process of Executing a Job Based on a Certification Ticket in the Storage Section)

Figure 5:
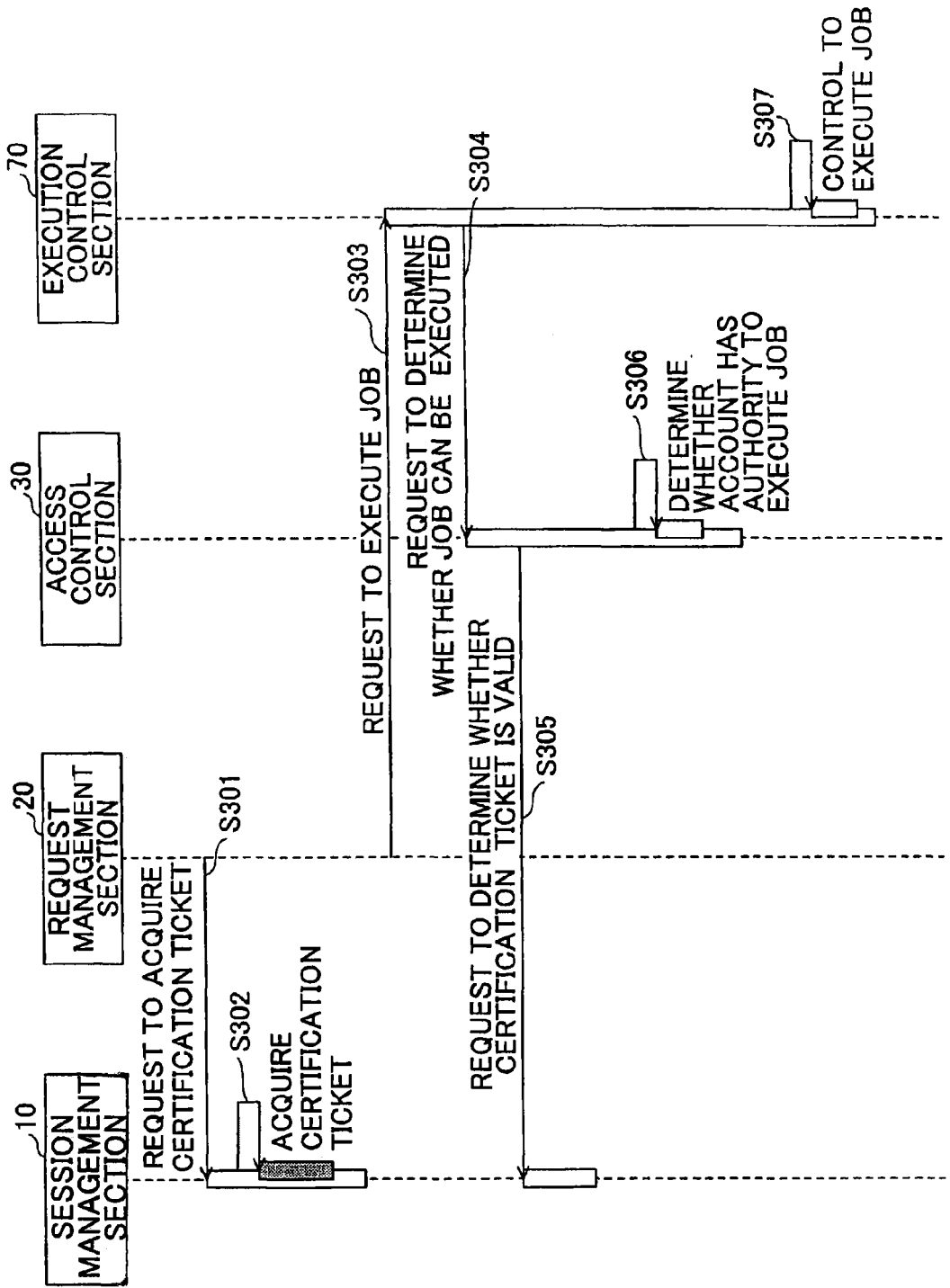
FIG. 5 is a sequence diagram showing an exemplary process of executing the job based on the certification ticket stored in the storage section.

FIG. 5 is a sequence diagram showing a process of executing a job based on the certification ticket stored in the storage section. Referring to FIG. 5, in step S301, the request management section 20 outputs a request to acquire the certification ticket to the session management section 10. When, for example, the instruction to execute a job includes an execution time, the request to acquire the certification ticket is output from the request management section 20 at a prescribed time in consideration of the execution time. Herein the term "a prescribed time in consideration of the execution time" refers to, for example, a time that is before the execution time and that is determined in consideration of the time period necessary to perform the processes from steps S301 until step S307 (job is executed) described below.

In the following step S302, the session management section 10 acquires the certificate ticket stored in the storage section 250. The certificate ticket acquired in this step may be stored in a storage unit such as a RAM accessible for reading and writing data at high speed in the image forming apparatus 200. In the following step S303, the request management section 20 outputs a request to execute the job corresponding to the certification ticket to the execution control section 70.

In the following step S304, the execution control section 70 outputs a request to determine whether the job can be executed to the access control section 30. In the following step S305, based on the request in step S304, the access control section 30 outputs a request to determine whether the certification ticket is valid to the session management section 10. Based on this request, the session management section 10 determines whether the certification ticket acquired in step S302 is valid.

In the following step S306, the access control section 30 acquires the job information corresponding to the certification ticket that has been determined valid in step S305, and verifies the execution authority with respect to the job. Herein, the term "to verify the execution authority with respect to the job" refers to determining whether the user account requesting to execute the job has the authority to execute the job. Whether the user account has the authority to execute the job is determined by reference to the authority information of each account in, for example, the storage section 250 in the image forming apparatus 200 based on the contents of the job included in the job information and the information of the account determined valid based on the certification ticket.

The term "Job information" refers to the data containing the contents of the job. The job information is generated in the request management section in, for example, step 204 in FIG. 4, and may be associated and stored with the certification ticket in the storage section 250.

In the following step S307, the execution control section 70 controls executing the job determined to be executed.

(Process of Canceling a Job by Processing of a Cancelling Certification Ticket)

Figure 6:
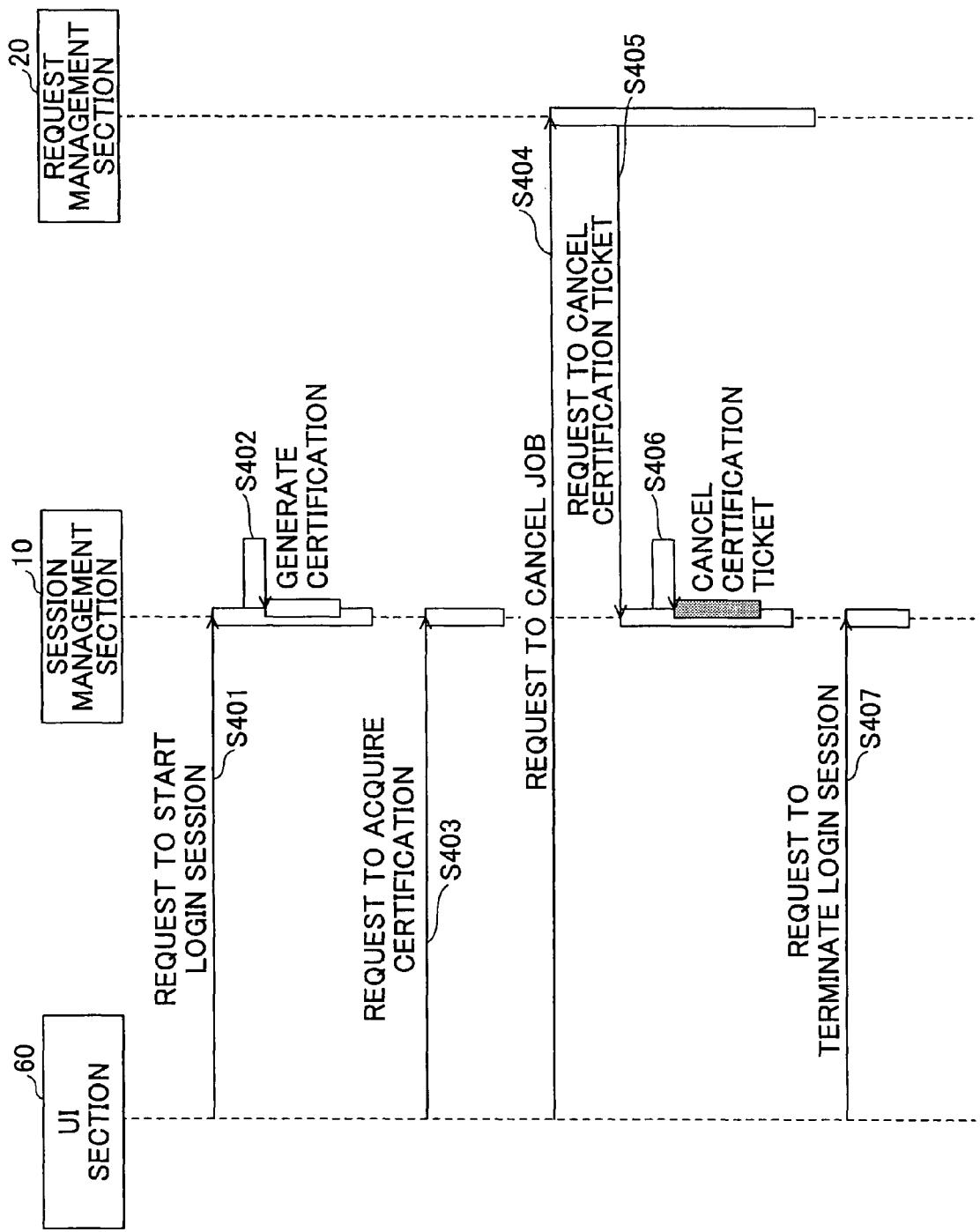
FIG. 6 is a sequence diagram showing an exemplary process of cancelling the job by cancelling the certification ticket.

FIG. 6 is a sequence diagram showing a process of cancelling the execution of the job by a process of cancelling the certification ticket. Referring to FIG. 6, the processes in steps S401 and S402 are the same as those in steps S101 and S102, therefore the descriptions of steps S401 and step S402 are herein omitted.

In the following step S403, when the operator inputs an instruction to cancel the job through the UI section 60, the UI section 60 outputs a request to acquire the authentication information which is the certification generated in step S402 to the session management section 10.

In the following step S404, the UI section 60 outputs a request to cancel the job to the request management section 20 along with the certification acquired in step S403.

In the following step S405, the request management section 20 outputs a request to cancel the certification ticket based on the request to cancel the job in step S404 to the session management section 10. In the following step S406, the session management section 10 cancels the certification ticket as requested in step S405. Herein, the certification ticket in the storage section 250 may be deleted or a prescribed information item of the certification ticket may be altered to invalidate the certification ticket.

In the following step S407, when the operator inputs a logout instruction through the UI section 60, the UI section 60 outputs a request to terminate the login session to the session management section 10. Based on this request, the session management section 10 terminates the login session of the user account.

(Figure Showing where a Job Cannot be Executed Due to Cancellation of a Certification Ticket)

Figure 7:
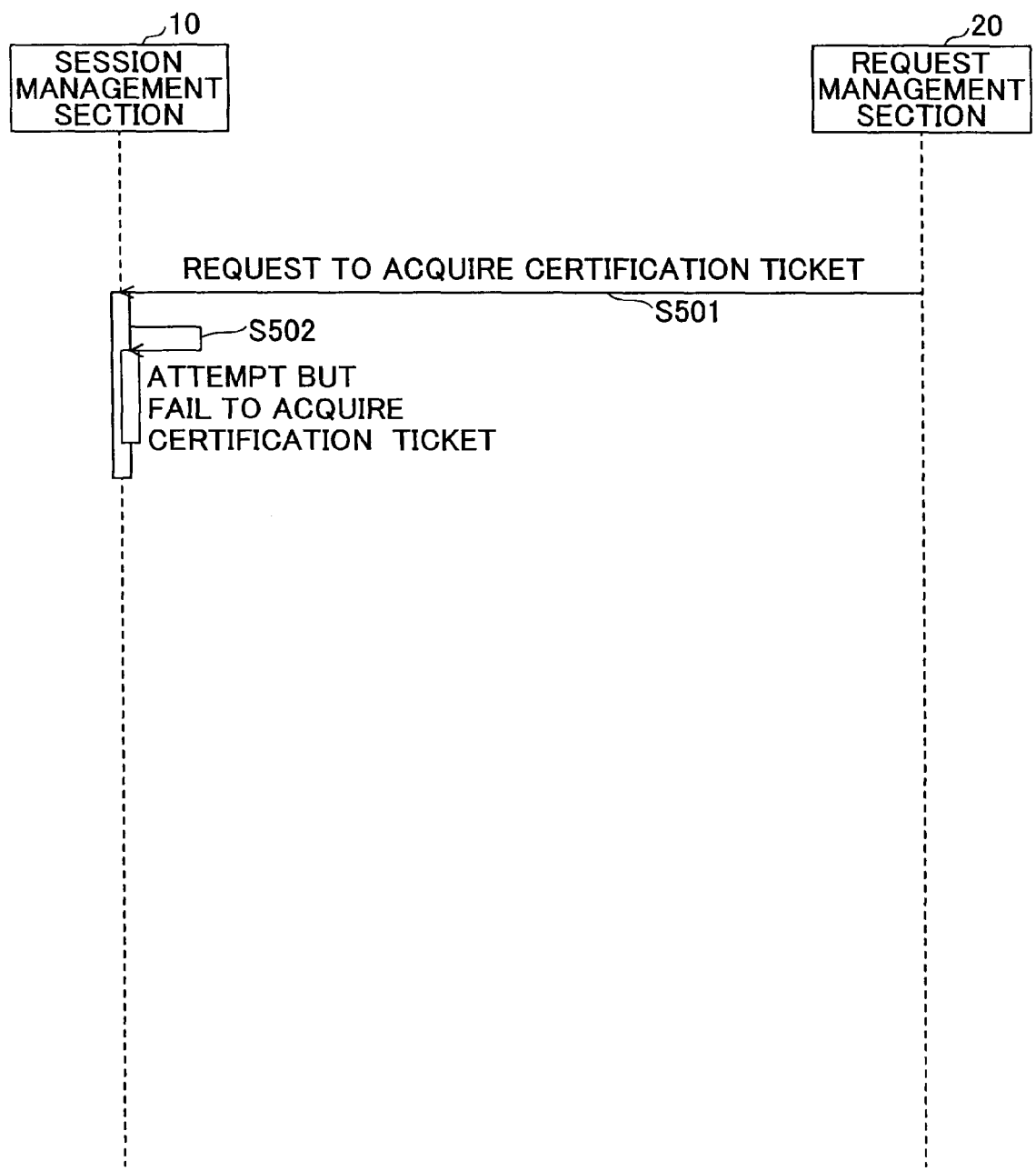
FIG. 7 is a sequence diagram showing that the job cannot be executed due to the cancellation of the certification ticket.

FIG. 7 is a sequence diagram showing where the job is not executed when the certification ticket is cancelled due to, for example, the process shown in FIG. 6. The term "the certification ticket is cancelled" refers to the situation where, for example, the certification ticket is deleted from the storage section 250.

Referring to FIG. 7, in step S501, the request management section 20 outputs a request to acquire the certification ticket to the session management section 10. This request may be started, for example, at a prescribed time in consideration of the execution time of the job.

In the following step S502, the session management section 10 attempts but fails to acquire the certification ticket in the storage section 250 because the certification ticket has been deleted already. As a result, the process for executing job is terminated in step S502.

After the process in step S502, a message that the job execution failed may be transmitted to prescribed destinations. The prescribed destinations may include a display device such as a display panel of the image forming apparatus 200, an address of the administrator of the image forming apparatus 200, or the destination addresses included in the job information when applicable.

(Sequence Diagram Showing where a Job Cannot be Executed because the Certification Ticket is not Valid)

Figure 8:
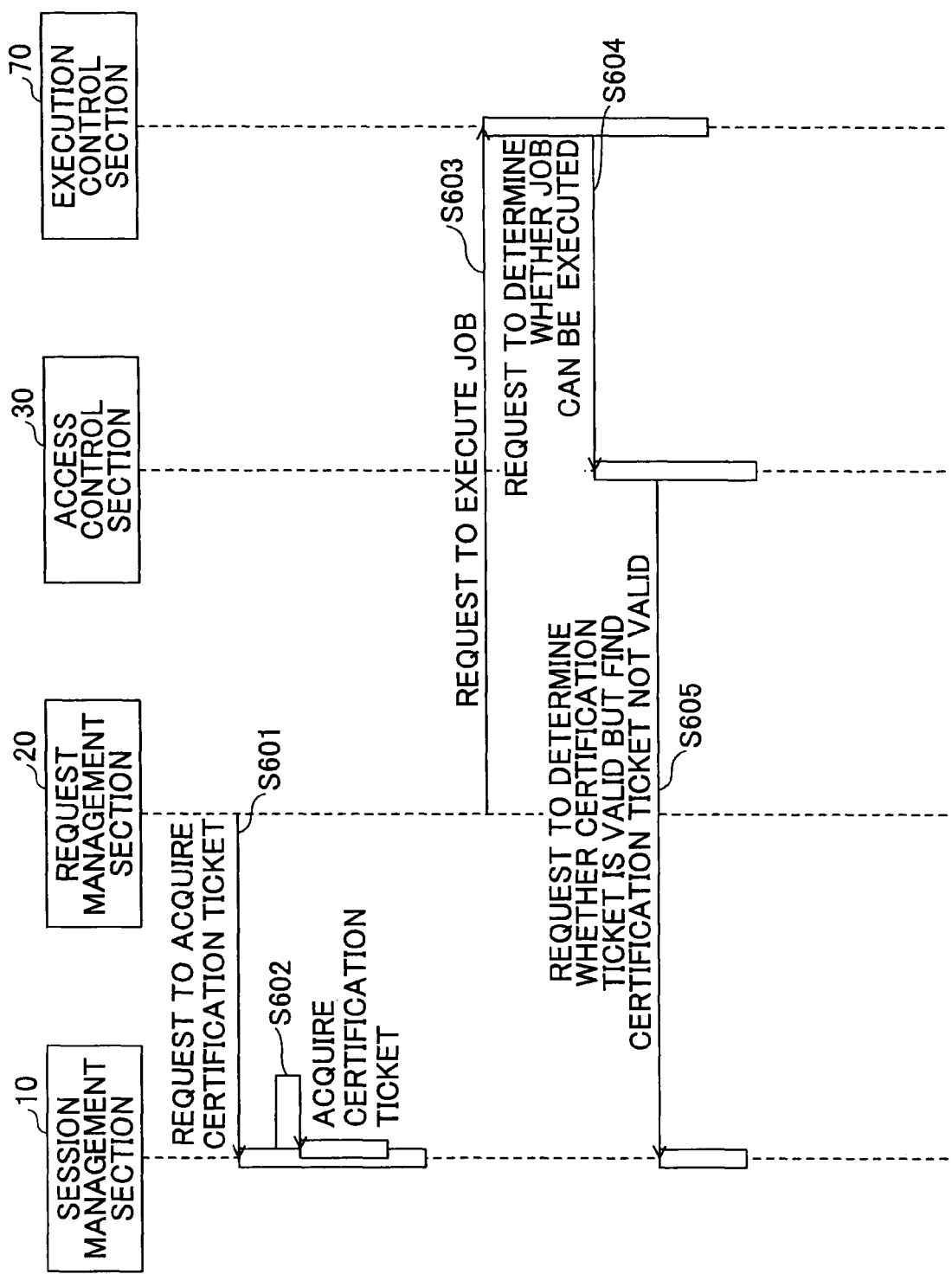
FIG. 8 is a sequence diagram showing that the job cannot be executed because the certification ticket is not valid.

FIG. 8 is a sequence diagram showing where the job cannot be executed when the certification ticket is not valid because a prescribed information item of the certification ticket is altered to invalidate the certification ticket by such processes as shown in FIG. 6. The processes in steps S601 through S604 in FIG. 8 are the same as those in steps S301 through S304, therefore the descriptions of steps S601 through S604 are herein omitted.

Referring to FIG. 8, in step S605, the access control section 30 outputs a request to determine whether the certification ticket is valid to the session management section 10. Based on this request, the session management section 10 determines whether the certification ticket acquired in step S602 is valid. Herein, a part of the information items in the certification ticket is altered. Therefore, it is determined that the certification ticket is not valid.

Based on the result, the access control section 30 does not perform any step beyond step S605. Therefore, the job cannot be executed. After step S605, a message that the job execution failed may be transmitted to prescribed destinations.

By doing this, it may become possible to prevent the execution of the job by using an altered certification ticket by an unauthenticated user, thereby maintaining the security of the image forming apparatus 200.

As an example of a case where the information items of the certification ticket is altered, there may be a case where, after a user requests a job, the same user inputs an instruction to delete the job. There may be another case where an unauthenticated user alters the certification ticket.

(Example where a Different Encryption Process is Applied to the Certification Ticket Depending on Execution Time of the Job)

Figure 9:
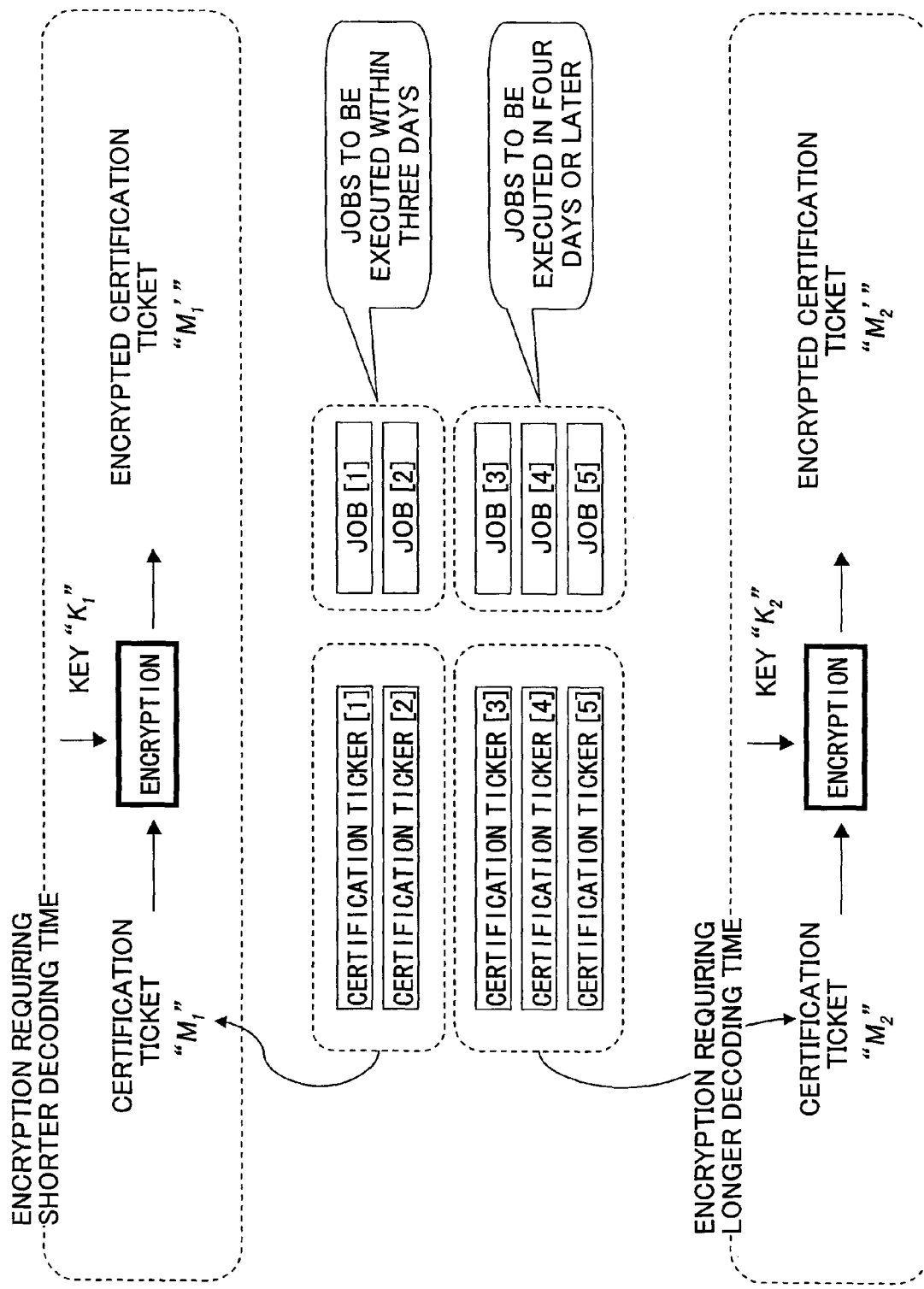
FIG. 9 is a drawing showing an example where different encryption processes are applied based on an execution time of the jobs.
Figure 10:
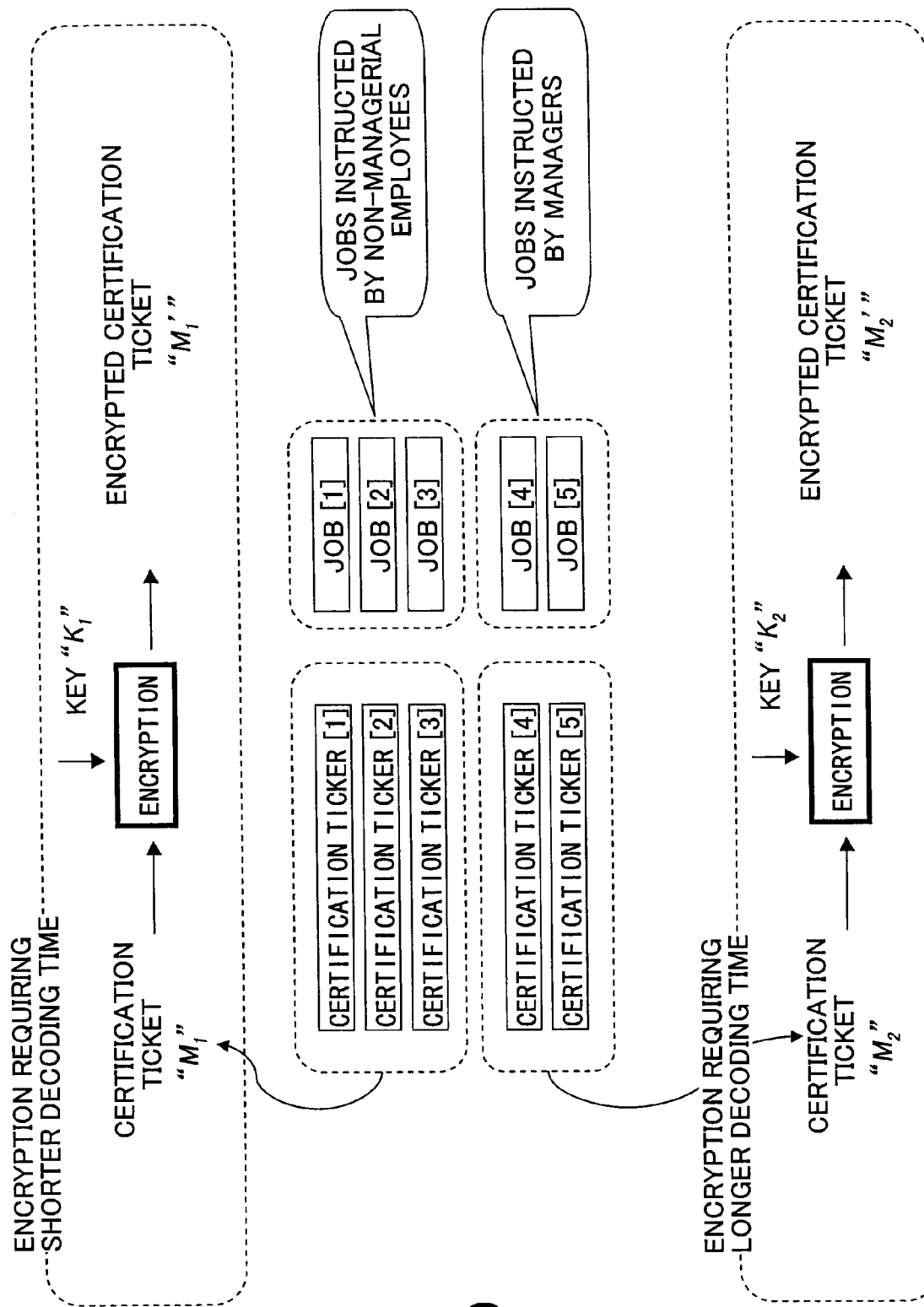
FIG. 10 is a drawing showing an example where different encryption processes are applied based on the importance of the jobs.

FIGS. 9 and 10 are drawings showing examples where the certification ticket is encrypted before being permanently stored. In FIGS. 9 and 10, encrypted certification tickets "$M_1$'" and "$M_2$'" are generated and stored in the storage section 250.

FIG. 9 shows where the encryption section 242 applies different encryption processes depending on the execution time of the jobs when the encryption section 242 supports plural encryption processes. In the example of FIG. 9, when the execution time of the job requested by a user is within three days of the current time, an encryption process that requires a shorter time to decode data is selected. On the other hand, when the execution time of the job requested by a user is four days or later from the current time, an encryption process that requires a longer time to decode data is selected.

It should be noted that the embodiment of the present invention is not limited to the examples described above. For example, different encryption processes may be selected and used depending on whether the execution time of the job designated by the operator is within a prescribed time range from the current time. Further, when the encryption section 242 can supports three or more encryption processes, plural divided time periods from the current time in accordance with the number of supported encryption processes are provided. Then, each the encryption processes arranged in the increasing order of decoding time correspond to each of the divided time period in the increasing order of time from the current time. By executing different encryption processes depending on the execution time of the jobs as described above, the encryption process requiring shorter decoding time is applied to the certification ticket corresponding to the job including the execution time closer to the current time.

FIG. 10 shows where the encryption section 242 applies different encryption processes depending on the importance of the jobs when the encryption section 242 supports plural encryption processes. The importance of the jobs may be graded according to the operators corresponding to the accounts requesting the jobs.

In the example of FIG. 10, it is assumed that the importance of the jobs requested by non-managerial employees is lower than that requested by managers. By doing this, the encryption process requiring a shorter decoding time is selected for the certification tickets corresponding to the jobs requested by non-managerial employees, and, on the other hand, the encryption process requiring a longer decoding time is applied to the certification tickets corresponding to the jobs requested by managers.

The importance of the jobs may be determined according to the functions executed by the jobs or according to the destinations when information is transmitted by the jobs, in addition to according to the users who requested the jobs as described above.

Further, when the importance of the jobs is determined according to the functions executed by the jobs, the importance of the fax transmission process may be specified higher than that of the scanning process. This is because scanning is a process of inputting information inside the image forming apparatus. On the other hand, fax transmission is a process of outputting information outside the image forming apparatus and the destinations are usually different from the users who requested the execution of the jobs. Therefore, preferably, the importance of the jobs including the output processes such as fax transmission and mail via a network is specified higher than that of the jobs for scanning processes.

Further, when the importance is determined depending on the destinations, the importance of the jobs for transmitting information outside the office may be specified higher than that for transmitting information inside the office. Furthermore, preferably, the importance depending on the destinations outside the office may be graded in more detail.

(Example where the Storage Unit for Storing Certification Tickets is Selected Based on Execution Time of Jobs)

Figure 11:
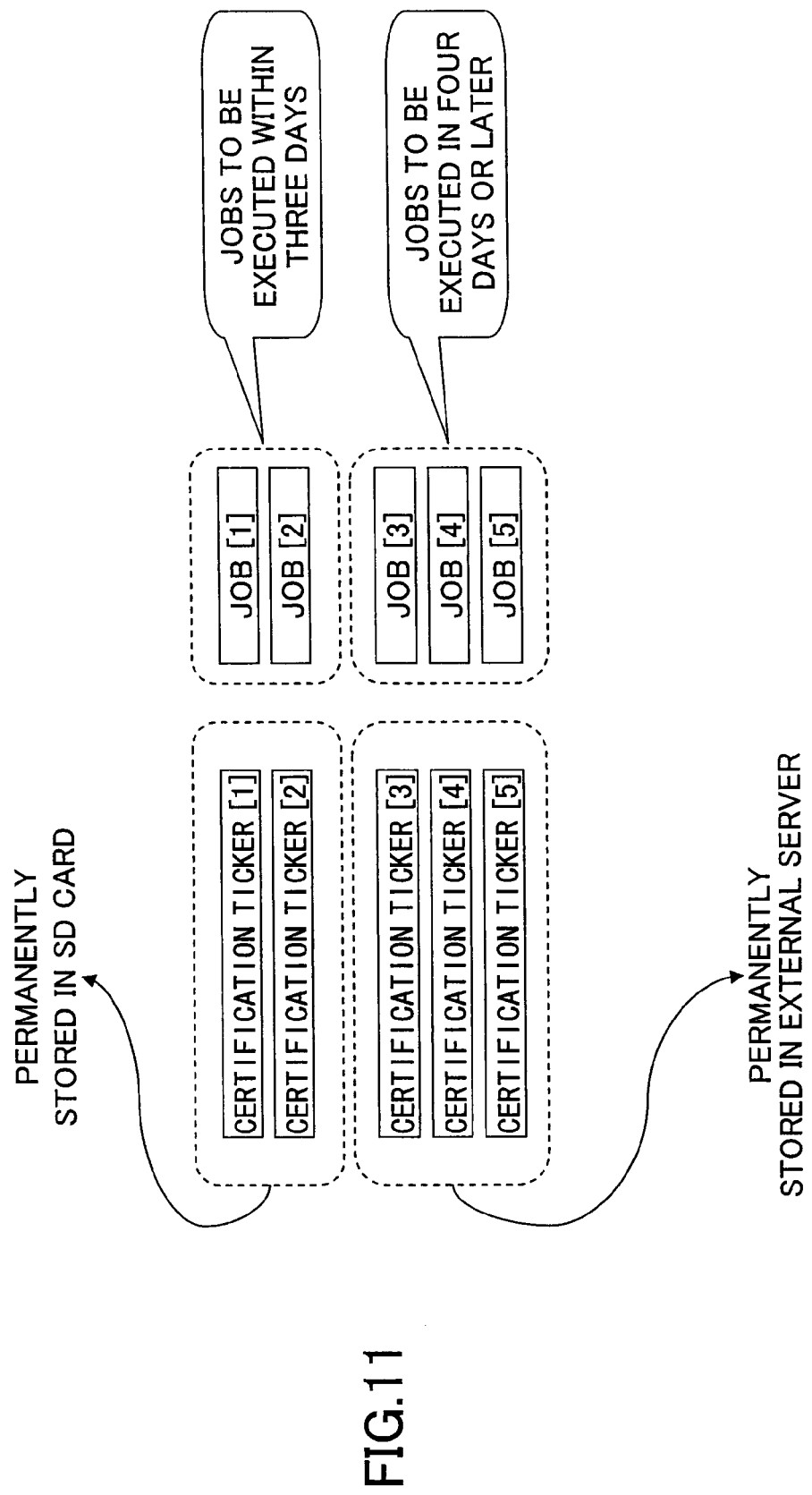
FIG. 11 is a drawing showing an example where the storage unit storing the certification is selected based on the execution time of the jobs.

FIG. 11 shows an example where the storage units storing the certification tickets are selected based on the execution time of jobs. In the example of FIG. 11, the storage section 250 includes plural storage units.

In the example of FIG. 11, the certification ticket corresponding to the job requested to be executed within three days of the current time is stored in an SD card. On the other hand, the certification ticket corresponding to the job requested to be executed in four days from the current time or later is stored in a hard disk device managed by an external server.

It should be noted that the embodiment of the present invention is not limited to the specific example in FIG. 11. As the example in FIG. 11 shows, preferably, the certification ticket corresponding to the job requested to be executed at a time closer to the current time may be stored in the storage unit in the image forming apparatus 200. On the other hand, the certification ticket corresponding to the job requested to be executed at time farther from the current time may be stored in the storage unit controlled by an external server (not shown). The storage unit storing certification ticket may be determined based on whether the execution time of the job corresponding to the certification ticket is within a prescribed time range.

It should be noted that preferably the storage unit controlled by an external server will be more robust against the deletion of the stored information compared with the storage unit in the image forming apparatus 200.

(Example where Different Compression Processes are Applied to Certification Tickets Based on the Execution Time of Jobs)

Figure 12:
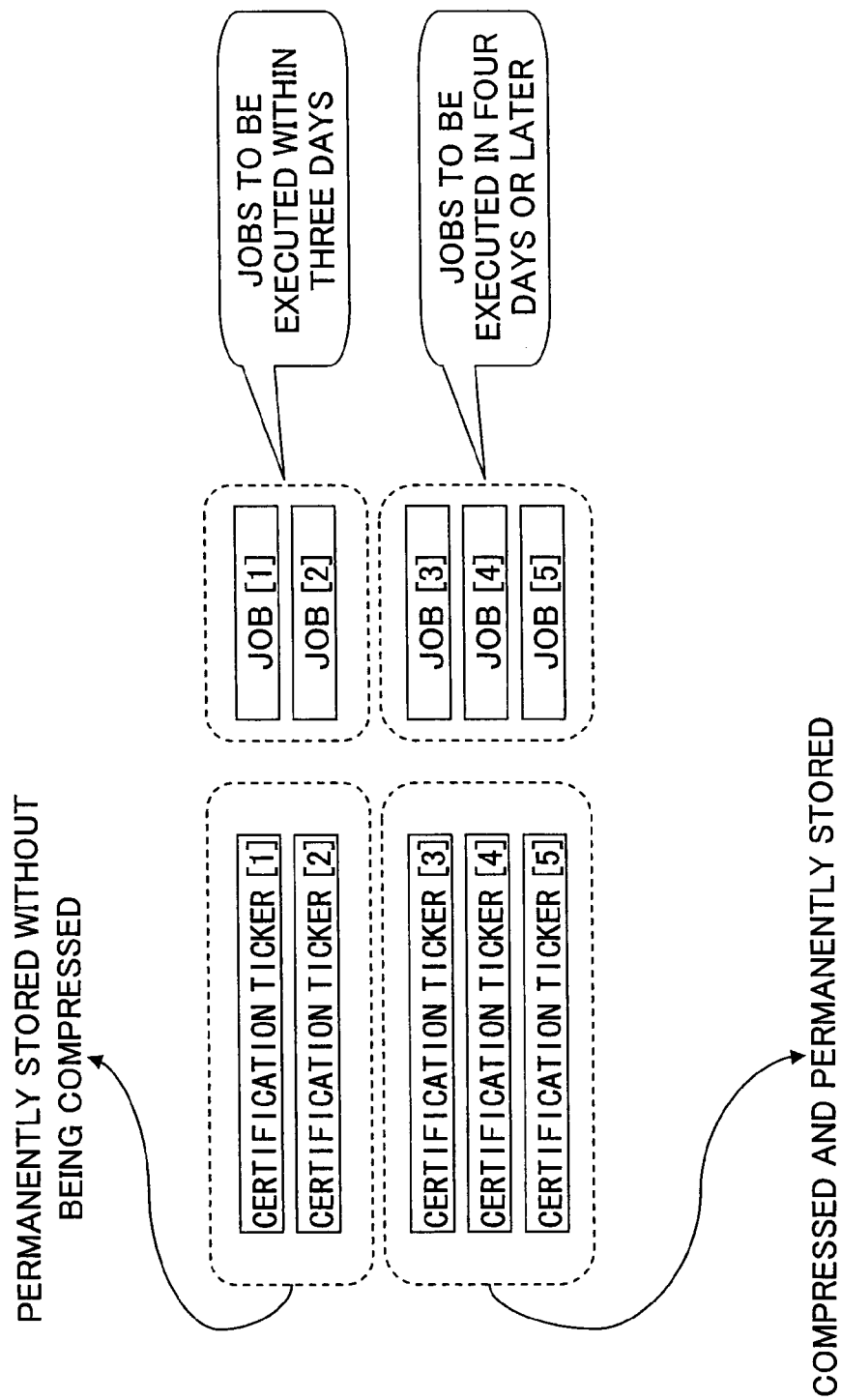
FIG. 12 is a drawing showing an example where different compressing processes are selected based on the execution time of the jobs.

FIG. 12 shows an example where a different compression process is applied to the certification tickets based on the execution time of jobs corresponding to the certification tickets. In the example of FIG. 12, the image forming apparatus 200 includes the compression section 243.

In the example of FIG. 12, the certification ticket corresponding to the job requested to be executed within three days of the current time is permanently stored without being compressed. On the other hand, the certification ticket corresponding to the job requested to be executed in four days from the current time or later is compressed and permanently stored.

It should be noted that the embodiment of the present invention is not limited to the specific example in FIG. 12. As the example in FIG. 12 shows, preferably, the certification ticket corresponding to the job requested to be executed closer to the current time may be stored in the storage section 250 without being compressed. On the other hand, the certification ticket corresponding to the job requested to be executed at time farther from the current time is compressed and then stored in the storage section 250. It should be noted that the compressed and stored certification ticket may remain until it becomes necessary for the certification ticket to be used to execute the job corresponding to the certificate ticket. The compressed and stored certification ticket may be decompressed and stored in the storage section 250 at a certain time before the execution time of the corresponding job.

By doing this, it becomes possible to use the recording area of the storage section 250 more effectively as well as to rapidly read the certification ticket corresponding to the job to be executed in a short time period.

Further, in the example of FIG. 12, descriptions of cases with and without compression are described. However, the embodiment of the present invention is not limited to this example. For example, the certification tickets may be compressed at different compression rates or with different compression methods. Preferable, compression methods requiring longer decompression time may be used for the certification ticket corresponding to the job to be executed at a time farther from the current time.

(Configuration of Computer)

FIG. 13 shows an exemplary configuration of a computer for an image forming apparatus according to an embodiment of the present invention. As shown in FIG. 13, the computer includes a main processing section 400, an input device 410, a display device 420, a printer 430, a scanner 440, and an HDD 490. The main processing section 400 is a main part to realize computer functions and includes a CPU 401, a ROM 408, and a RAM 409. The CPU 401 executes a computer program according to an embodiment of the present invention by reading the computer program read from the ROM 408 or the like and loading the computer program into the RAM 409. The ROM 408 is a nonvolatile memory and stores the programs, such as computer programs, executed by the CPU 401, parameters necessary to control the image forming apparatus, and the like. The RAM 409 is a working memory used when the CPU 401 works.

The input device 410 may be, for example, a keyboard used when an operator inputs an instruction. The display device 420 displays, for example, the status of the computer. The printer 430 is a device for forming an image onto a medium. The scanner 440 is a device for optically reading an image formed on a medium. The HDD 490 stores a large amount of data like image data.

A computer program realizing a job control method according to an embodiment of the present invention may be stored in the HDD 490 or the ROM 408, or may be stored in a recording medium insertable into a drive device (not shown).

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

The present application is based on and claims the benefit of priority of Japanese Patent Application No. 2007-240088, filed on Sep. 14, 2007, the entire contents of which are hereby incorporated herein by reference.

What is claimed is:

1. An image forming apparatus for executing a job request based on authority of an account, comprising:

a certification ticket generation unit configured to generate a certification ticket corresponding to the job request and account information of the account instructing execution of the job request;

a job request information generation unit configured to generate job request information of the job request;

a certification ticket validity determination unit configured to determine whether the certification ticket is valid;

a job request validity determination unit configured to determine whether the account has the authority to execute the job request by referring to authority information stored in a nonvolatile storage unit of the image forming apparatus based on acquired job request information corresponding to the certification ticket and the account information corresponding to the certification ticket;

a job request control unit configured to execute the job request, the execution of the job request having been determined valid by the job request validity determination unit;

a job request management unit that, when an instruction to execute the job request includes a prescribed execution start time to start execution of the job request, is configured to acquire the certification ticket from the storage unit at a prescribed time ahead of the prescribed execution start time determined based on the prescribed execution start time and a time to perform an acquisition of the certification ticket from the storage unit and to request to determine a validity of the certification ticket; and an encryption unit configured to select for encryption of the certification ticket one of plural encryption methods based on the prescribed execution start time to start execution of the job request.

2. The image forming apparatus according to claim 1, further comprising:

a storage unit interface configured to associate and store the certification ticket with the job request information in the storage unit.

3. The image forming apparatus according to claim 2, further comprising:

a certification ticket cancellation unit configured to perform a cancellation process with respect to the certification ticket stored in the storage unit, wherein, when the certification ticket is cancelled by the certification ticket cancellation unit, the certification ticket validity determination unit is configured to determine that the certification ticket is not valid.

4. The image forming apparatus according to claim 2, wherein the storage unit interface is configured to store the certification ticket encrypted by the encryption unit in the storage unit.

5. The image forming apparatus according to claim 4, wherein, when each job request is graded in terms of an importance of the respective job request, the encryption unit is configured to select one of the plural encryption methods for encrypting the certification ticket based on the importance of the respective job request.

6. The image forming apparatus according to claim 2, further comprising:

a compression unit configured to compress the certification ticket, wherein, when the instruction to execute the job request includes the prescribed execution start time, the compression unit is configured to compress the certification ticket based on the prescribed execution time, and the storage unit interface is configured to store the certification ticket compressed by the compression unit in the storage unit.

7. The image forming apparatus according to claim 2, wherein the storage unit interface is connected to plural storage units having different access rates from each other and, when the instruction to execute the job request includes the prescribed execution start time, the storage unit interface is configured to select one of the plural storage units in which the certification ticket and the job request information corresponding to the certification ticket are to be stored based on the prescribed execution start time of the job request.

8. The image forming apparatus according to claim 1, further comprising:

an account information generation unit configured to generate account information of the account each time when the account is logged in.

9. A job request control method in an image forming apparatus for executing a job request based on authority of an account, the method comprising:

a certification ticket generation step of generating a certification ticket corresponding to the job request and account information of the account instructing execution of the job request;

a job request information generation step of generating job request information of the job request;

a certification ticket validity determination step of determining whether the certification ticket is valid;

a job request validity determination step of determining whether the account has the authority to execute the job request by referring to authority information stored in a nonvolatile storage unit of the image forming apparatus based on acquired job request information corresponding to the certification ticket and the account information corresponding to the certification ticket;

a job control step of executing the job request, the execution of the job request having been determined valid in the job request validity determination step;

a job request management step of, when an instruction to execute the job request includes a prescribed execution start time to start execution of the job request, acquiring the certification ticket stored in the storage unit at a prescribed time ahead of the prescribed execution start time determined based on the prescribed execution start time and a time to perform the acquiring, and requesting to determine a validity of the certification ticket; and an encryption step of selecting for encryption of the certification ticket one of plural encryption methods based on the prescribed execution start time to start execution of the job request.

10. The job request control method according to claim 9, further comprising:

a storage step of associating and storing the certification ticket with the job request information in the storage unit.

11. The job request control method according to claim 10, further comprising:

a certification ticket cancellation step of performing a cancellation process with respect to the certification ticket stored in the storage step, wherein when the certification ticket is cancelled in the certification ticket cancellation step, the certification ticket is determined not valid in the certification ticket validity determination step.

12. The job request control method according to claim 10, wherein in the storage step, the certification ticket encrypted in the encryption step is stored in the storage unit.

13. The job request control method according to claim 10, further comprising:

a compression step of compressing the certification ticket, wherein in the storage step, when the instruction to execute the job request includes the prescribed execution start time, the certification ticket compressed based on the prescribed execution start time in the compression step is stored in the storage unit.

14. The job request control method according to claim 10, wherein the storage step includes a selection step of selecting, when the instruction to execute the job request includes the prescribed execution start time, one of plural storage units in which the certification ticket and the job request information corresponding to the certification ticket are to be stored based on the prescribed execution start time of the job request.

15. The job request control method according to claim 9, further comprising:

an account information generation step of generating account information of the account each time when the account is logged in.

* * * * *